(12) United States Patent
Takeo et al.

(10) Patent No.: US 9,982,416 B2
(45) Date of Patent: May 29, 2018

(54) SHOVEL AND METHOD OF CONTROLLING SHOVEL

(71) Applicants: SUMITOMO(S.H.I.) CONSTRUCTION MACHINERY CO., LTD., Tokyo (JP); SUMITOMO HEAVY INDUSTRIES, LTD., Tokyo (JP)

(72) Inventors: Jitsutaka Takeo, Chiba (JP); Makoto Yanagisawa, Chiba (JP)

(73) Assignees: SUMITOMO(S.H.I.) CONSTRUCTION MACHINERY CO., LTD., Tokyo (JP); SUMITOMO HEAVY INDUSTRIES, LTD., Tokyo (JP)

( * ) Notice: Subject to any disclaimer, the term of this patent is extended or adjusted under 35 U.S.C. 154(b) by 291 days.

(21) Appl. No.: 14/678,100

(22) Filed: Apr. 3, 2015

(65) Prior Publication Data
US 2015/0211212 A1 Jul. 30, 2015

Related U.S. Application Data

(63) Continuation of application No. PCT/JP2013/070086, filed on Jul. 24, 2013.

(30) Foreign Application Priority Data

Oct. 10, 2012 (JP) .................. 2012-225381

(51) Int. Cl.
*H02J 7/00* (2006.01)
*E02F 9/26* (2006.01)
(Continued)

(52) U.S. Cl.
CPC ............... *E02F 9/268* (2013.01); *B60L 3/00* (2013.01); *B60L 3/04* (2013.01); *B60L 11/1809* (2013.01);
(Continued)

(58) Field of Classification Search
CPC ...... H02J 7/0014; H02J 7/0016; H02J 7/0018; H02J 7/0019
(Continued)

(56) References Cited

U.S. PATENT DOCUMENTS 7,423,410 B2 9/2008 Yoshio
8,030,893 B2 * 10/2011 Nakatsuji ............ H01M 10/441
320/116

(Continued)

FOREIGN PATENT DOCUMENTS

EP 2383862 11/2011
JP H06-331679 12/1994
(Continued)

OTHER PUBLICATIONS

International Search Report dated Oct. 8, 2013.

*Primary Examiner* — Drew A Dunn
*Assistant Examiner* — Zixuan Zhou
(74) *Attorney, Agent, or Firm* — IPUSA, PLLC

(57) ABSTRACT

A shovel includes an electrical power storage device that may be made of a plurality of electrical power storage cells for charging electricity generated by a generator; and an electrical power storage administration part that includes equalizing circuits each of which may be connected to corresponding one of the plurality of electrical power storage cells, an equalizing circuit defect determination part which determines whether a defect exists in the equalizing circuit, and a shutoff part which shuts off a connection between the equalizing circuit in which the defect may be determined to exist and the electrical power storage cell connected to the equalizing circuit.

6 Claims, 7 Drawing Sheets

(51) Int. Cl.
  *E02F 9/20* (2006.01)
  *B60L 11/18* (2006.01)
  *E02F 3/32* (2006.01)
  *B60L 3/00* (2006.01)
  *B60L 3/04* (2006.01)
  *H02J 7/34* (2006.01)

(52) U.S. Cl.
  CPC ....... *B60L 11/1862* (2013.01); *B60L 11/1866* (2013.01); *E02F 3/32* (2013.01); *E02F 9/2091* (2013.01); *H02J 7/0018* (2013.01); *H02J 7/0054* (2013.01); *B60L 2200/40* (2013.01); *B60L 2210/12* (2013.01); *B60L 2210/14* (2013.01); *B60L 2240/547* (2013.01); *B60L 2240/80* (2013.01); *H02J 7/345* (2013.01); *Y02T 10/7005* (2013.01); *Y02T 10/7044* (2013.01); *Y02T 10/7061* (2013.01); *Y02T 10/7225* (2013.01); *Y02T 10/7233* (2013.01); *Y10S 903/903* (2013.01)

(58) Field of Classification Search
  USPC .................................................. 320/116–119
  See application file for complete search history.

(56) References Cited

U.S. PATENT DOCUMENTS

| | | | |
|---|---|---|---|
| 2001/0011881 | A1 | 8/2001 | Emori et al. |
| 2011/0288711 | A1* | 11/2011 | Yanagisawa .......... B60W 10/26 701/22 |
| 2012/0091964 | A1 | 4/2012 | Vance et al. |
| 2012/0139553 | A1* | 6/2012 | Nortman ............... H02J 7/0016 324/537 |
| 2013/0335095 | A1* | 12/2013 | Kiuchi .................. H01M 10/48 324/426 |

FOREIGN PATENT DOCUMENTS

| | | |
|---|---|---|
| JP | 2004-134372 | 4/2004 |
| JP | 2004-266937 | 9/2004 |
| JP | 2006-320183 | 11/2006 |
| JP | 2006-351384 | 12/2006 |
| JP | 2007-151242 | 6/2007 |
| JP | 2009-159769 | 7/2009 |
| JP | 2010-004679 | 1/2010 |
| JP | 2010-088179 | 4/2010 |
| JP | 2010-213417 | 9/2010 |
| JP | 2011-205865 | 10/2011 |
| WO | 2010/038347 | 4/2010 |

\* cited by examiner

SHOVEL AND METHOD OF CONTROLLING SHOVEL

RELATED APPLICATION

This application is a continuation application filed under 35 U.S.C. 111 (a) claiming the benefit under 35 U.S.C. 120 and 365(c) of a PCT International Application No. PCT/JP2013/070086 filed on Jul. 24, 2013, which is based upon and claims the benefit of priority of the Japanese Patent Application No. 2012-225381 filed on Oct. 10, 2012, the entire contents of which are incorporated herein by reference.

BACKGROUND

Technical Field

The present invention relates to a shovel including an electrical power storage device formed by multiple electrical power storage cells for charging electricity generated by a generator and multiple equalizing circuits respectively connected to multiple electrical power storage cells and a method of controlling the shovel.

Description of Related Art

There is a capacitor unit including multiple electrical double layer capacitors (cells) connected in series and balance circuits (equalizing circuits) respectively provided for the cells.

SUMMARY

A shovel of an embodiment of the present invention includes a lower-part traveling body; an upper-part swiveling body that is mounted on he lower-part traveling body through a swivel mechanism and includes a boom, an arm, a bucket, a boom cylinder for hydraulically driving the boom, an arm cylinder for hydraulically driving the arm, a bucket cylinder for hydraulically driving the bucket, main pump, a control valve, an engine, a motor generator, a swivel motor, an inverter for the motor generator, an inverter for the swivel motor, and a controller, wherein the boom cylinder, the arm cylinder, and the bucket cylinder are connected to the main pump through the control valve, wherein the control valve functions as a hydraulic control device that controls a hydraulic system, wherein the main pump is driven by the engine, wherein the motor generator assists the engine and generates electricity, wherein the controller performs a drive control of the shovel based on an input using an operation lever, the shovel further includes an electrical power storage device that is made of a plurality of electrical power storage cells for charging electricity generated by a generator; equalizing circuits each of which is connected to corresponding one of the plurality of electrical power storage cells and includes a balancing switch and a circuit protecting switch; and an equalizing control part that outputs a balance control signal for switching between shutoff or conduction of the balancing switch and a circuit protection signal for shutting off the circuit protecting switch.

DETAILED DESCRIPTION

In a capacitor unit including a great number of cells, if the cells are degraded, nonuniformity occurs among the electric capacities of the cells. When charging and discharging are repeated while the nonuniformity occurs among the electric capacities of the cells, a load to the cell having a high degree of the degradation further increases. Thus, the nonuniformity becomes more conspicuous and the electrostatic capacitance of the cell having a high degree of the degradation further decreases. As a result, the electrostatic capacitance (i.e., an electrical power storage quantity) of the entire capacitor unit, which is the sum of the electric capacities of the multiple cells, decreases and the internal resistance increases.

For this, the equalizing circuit disclosed in Patent Document 1 performs equalization to the cell having a predetermined inter-electrode voltage value or greater at a certain time point. Said differently, the cell having the predetermined inter-electrode voltage value or greater is forcibly discharged to make the inter-electrode voltage a predetermined value so as to equalize the inter-electrode voltages among the multiple cells.

However, when the equalizing circuit short-circuits, the cell corresponding to the equalizing circuit may become in an over discharged state so as to give a bad influence to the capacitor unit.

Therefore, in a case where there occurs a defect in the equalizing circuit, it is desired to prevent the cell corresponding to the equalizing circuit from being in the over discharged state.

With the above means, there is provided a shovel that prevents the cell corresponding to the equalizing circuit causing the defect from being in the over discharged state and a method of controlling the shovel.

An embodiment of the present invention is described with reference to figures.

Figure 1:
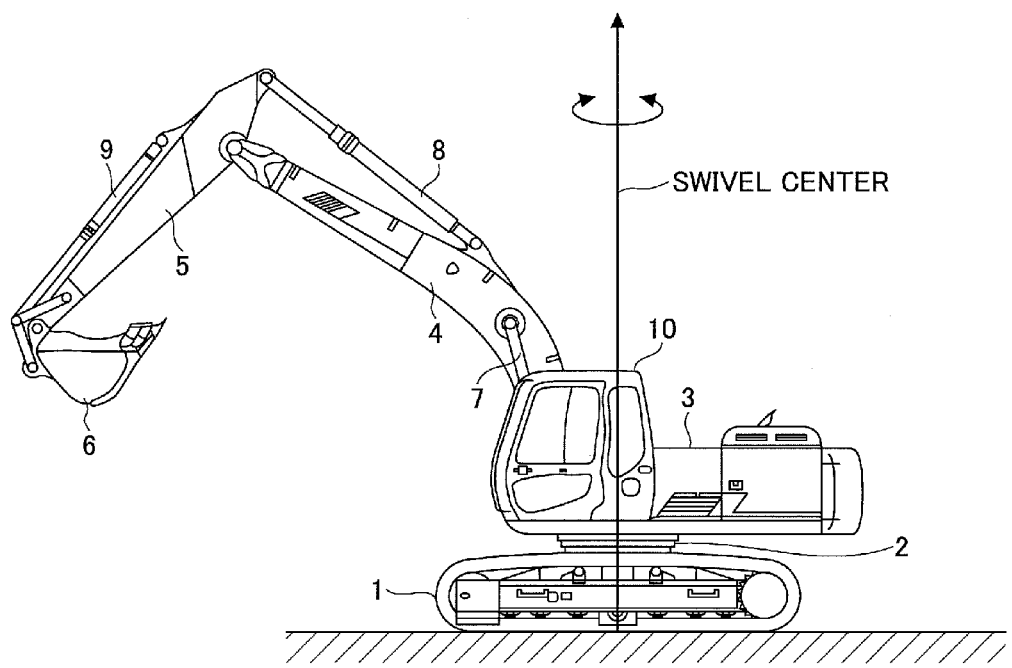
FIG. 1 is a side view of a hybrid-type shovel.

FIG. 1 is a side view of the shovel of the embodiment. The shovel illustrated in FIG. 1 is a hybrid-type shovel. However, the present invention is not limited to the hybrid-type shovel and is applicable to any type of shovel as long as an electrical power storage device is provided as a driving power source for driving an electrical load.

Referring to FIG. 1, an upper-part swiveling body 3 is installed in a lower-part traveling body 1 of the hybrid-type shovel through a swivel mechanism 2. The upper-part swiveling body 3 includes a boom 4, an arm 5, a bucket 6, a boom cylinder 7 for hydraulically driving the boom 4, an arm cylinder 8 for hydraulically driving the arm 5, and a bucket cylinder 9 for hydraulically driving the bucket 6. Further, a cabin 10 and a power source are mounted on the upper-part swiveling body 3.

Figure 2:
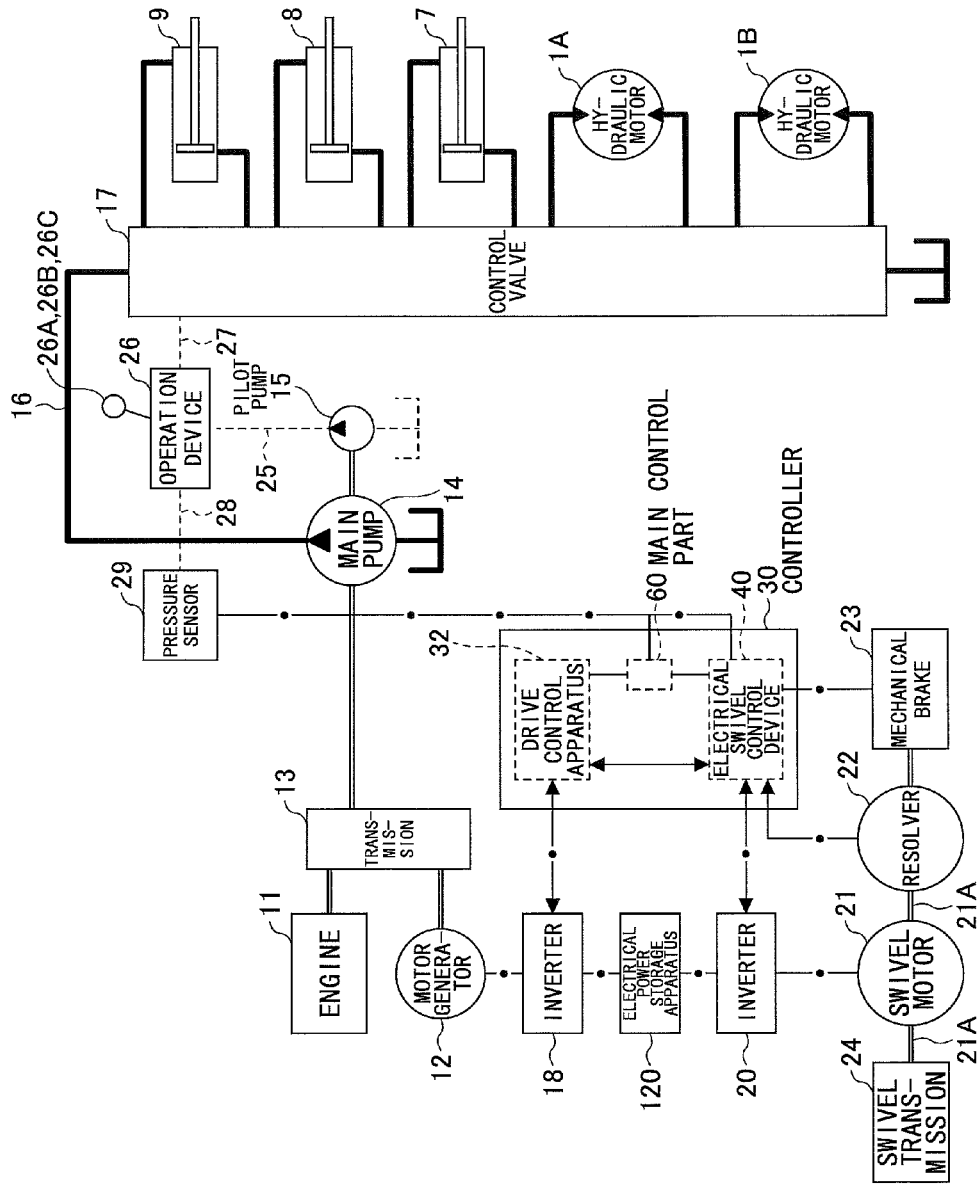
FIG. 2 is a block diagram illustrating a structure of a drive system of the hybrid-type shovel of an embodiment of the present invention.

FIG. 2 is a block diagram illustrating a drive system of the working machine illustrated in FIG. 1. Referring to FIG. 2, a mechanical power system is indicated by a double line, a high-pressure hydraulic line is indicated by a solid line, a pilot line is indicated by a broken line, and an electrical drive and control system is indicated by a dot chain line.

An engine 11 as a mechanical drive part and a motor generator 12 as an assist drive part are both connected to an input shaft of a transmission 13. A main pump 14 and a pilot pump 15 are connected to an output shaft of the transmission 13. A control valve 17 is connected to the main pump 14 through a high-pressure hydraulic line 16.

The control valve 17 is a hydraulic control device that controls a hydraulic system. Hydraulic motors 1A (for the right) and 1B (for the left) for the lower-part traveling body 1, the boom cylinder 7, the arm cylinder 8, and the bucket cylinder 9 are connected to the control valve 17 through the high-pressure hydraulic line 16.

An electrical power storage apparatus 120 including a capacitor unit for electrical power storage or a battery is connected to the motor generator 12 through an inverter 18. Within this embodiment, the electrical power storage apparatus 120 includes a capacitor unit 19 as an electrical power storage device, for example, a lithium ion capacitor (LIC) or electric double layer capacitor (EDLC) as an electrical power storage device. A swivel motor 21 is connected to the electrical power storage apparatus 120 through the inverter 20. The capacitor unit 19 is exemplified above as the electrical power storage device. However, a chargeable secondary battery such as a lithium ion battery (LIB) or another mode of a power source capable of exchanging the electrical power may be used instead of the capacitor unit 19.

A resolver 22, a mechanical brake 23, and a swivel transmission 24 are connected to a rotation shaft 21A of the swivel motor 21. An operation device 26 is connected to the pilot pump 15 through a pilot line 25.

The control valve 17 and a pressure sensor 29 as a lever operation detection part are connected to the operation device 26 through hydraulic lines 27 and 28, respectively. The pressure sensor 29 is connected to a controller 30 that controls to drive an electrical system.

The inverter 18, which is provided between the motor generator 12 and the electrical power storage apparatus 120 as described above, controls the operation of the motor generator 12 based on a command sent from the controller 30. Therefore, while the inverter 18 performs a drive control of power running of the motor generator 12, the inverter 18 supplies necessary electrical power to the motor generator 12 from the electrical power storage apparatus 120. While regeneration of the motor generator 12 is subjected to a drive control, electrical power generated by the motor generator 12 is stored in the capacitor unit 19 of the electrical power storage apparatus 120.

The electrical power storage apparatus 120 is arranged between the inverter 18 and the inverter 20. With this, while at least one of the motor generator 12 and the swivel motor 21 performs a power running operation, the electrical power storage apparatus 120 supplies electrical power necessary for the power running. While at least one of the motor generator 12 and the swivel motor 21 performs a regeneration operation, the electrical power storage apparatus 120 stores regeneration electrical power generated by the regeneration operation.

The inverter 20 is provided between the swivel motor 21 and the electrical power storage apparatus 120 as described above, controls the operation of the swivel motor 21 based on a command sent from the controller 30. Therefore, while the inverter 18 controls the power running of the swivel motor 21, the inverter 18 supplies necessary electrical power to the swivel motor 21 from the electrical power storage apparatus 120. While the swivel motor 21 performs the regeneration operation, the electrical power generated by the swivel motor 21 is stored in the capacitor unit 19 of the electrical power storage apparatus 120.

A charge and discharge control for controlling the capacitor unit 19 of the electrical power storage apparatus 120 are performed by the controller 30 based on a charging condition of the capacitor unit 19, an operational condition of the motor generator 12 (the power running operation or the regeneration operation), and an operational condition of the swivel motor 21 (the power running operation or the regeneration operation).

The controller 30 is a control device for performing a drive control of the shovel. The controller 30 includes a drive control apparatus 32, an electrical swivel control device 40, and a main control part 60. The controller 30 is made of an arithmetic processing unit including a central processing unit (CPU) and an internal memory. The drive control apparatus 32, the electrical swivel control device 40, and the main control part 60 are implemented by the CPU of the controller 30 when a program for the drive control stored in the internal memory is run.

The arithmetic processing unit (not illustrated) converts a signal input from the pressure sensor 29 to a speed command. The operation amount of the lever 26A is converted to a speed command (rad/s) for rotating the swivel motor 21. This speed command is inputted into the drive control apparatus 32, the electrical swivel control device 40, and the main control part 60.

The drive control apparatus 32 is a control apparatus for performing an operational control to control the motor generator 12 (a switchover between the power running operation and the regeneration operation) and a charge and discharge control of the capacitor unit 19. The drive control apparatus 32 switches between the power running operation and the regeneration operation depending on a state of a load of the engine 11 and the charging condition of the capacitor unit 19. The drive control apparatus 32 switches between the power running operation and the regeneration operation of the motor generator 12 so as to perform a charge and discharge control of the capacitor through the inverter 18.

Figure 3:
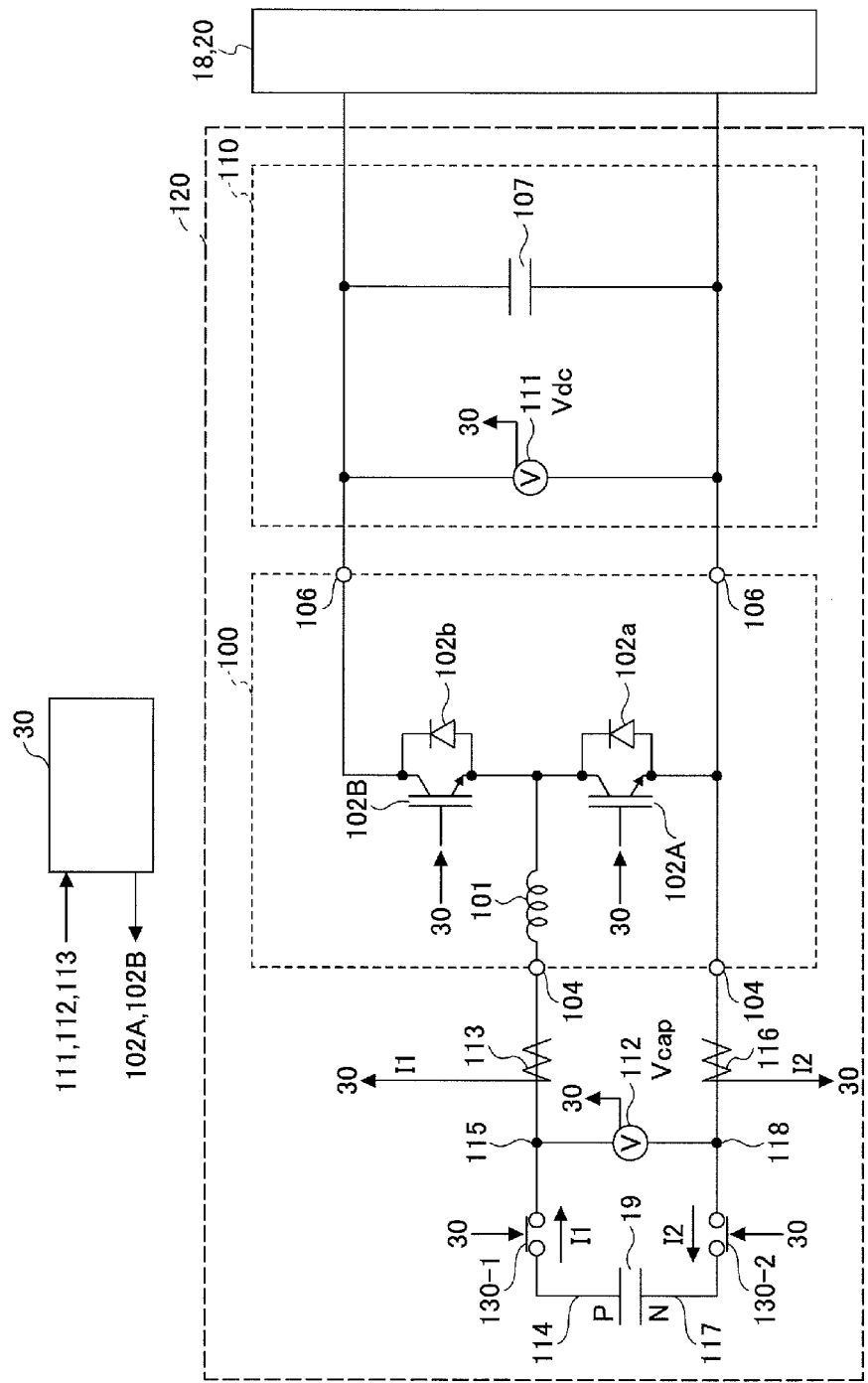
FIG. 3 is a circuit diagram of an electrical power storage apparatus.

FIG. 3 is a circuit diagram of the electrical power storage apparatus 120. The electrical power storage apparatus 120 includes the capacitor unit 19 as the electrical power storage device, a buck-boost converter 100, and a DC bus 110. The DC bus 110 controls exchanges of electrical power among the capacitor unit 19, the motor generator 12, and the swivel motor 21. The capacitor unit 19 includes a capacitor voltage detection part 112 for detecting a capacitor voltage value and a capacitor current detection part 113 for detecting a capacitor current value. The capacitor voltage value and the capacitor current value, which are detected by the capacitor voltage detection part 112 and the capacitor current detection part 113, respectively, are supplied to the controller 30.

The buck-boost converter 100 switches between a boosting operation and a bucking operation so that a DC bus voltage value is within a predetermined range depending on the operational condition of the motor generator 12 and the swivel motor 21. The DC bus 110 is arranged among the inverter 18, the inverter 20, and the buck-boost converter 100 so as to give or receive the electrical power among the capacitor unit 19, the motor generator 12, and the swivel motor 21.

A switchover control between the boosting operation and the bucking operation in the buck-boost converter 100 is performed based on the DC bus voltage value detected by the DC bus voltage detection part 111, the capacitor voltage value detected by the capacitor voltage detection part 112, and the capacitor current value detected by the capacitor current detection part 113.

In the above described structure, the electrical power generated by the motor generator 12 being an assist motor is supplied to the DC bus 110 of the electrical power storage apparatus 120 through the inverter 18A and supplied to the capacitor unit 19 through the buck-boost converter 100. The regenerative electrical power generated by the swivel motor 21 is supplied to the DC bus 110 of an electrical power storage apparatus 120 through the inverter 20 and supplied to the capacitor unit 19 through the buck-boost converter 100.

The buck-boost converter 100 includes a reactor 101, a boost insulated gate bipolar transistor (IGBT) 102A for the boosting operation, a buck insulated gate bipolar transistor (IGBT) 102B for the bucking operation, power source connection terminals 104 for connecting the capacitor unit 19, output terminals 106 for connecting the inverters 18 and 20, and a smoothing capacitor 107 inserted in parallel to the pair of the output terminals 106. The DC bus 110 connects the output terminals 106 of the buck-boost converter 100 to the inverters 18 and 20.

An end of the reactor 101 is connected to an intermediate point between the boost IGBT 102A and the buck IGBT 102B, and the other end of the reactor 101 is connected to the power source connection terminal 104. The reactor 101 is provided to supply an induced electromotive force generated when the boost IGBT 102A is turned on and off.

The boost IGBT 102A and the buck IGBT 102B include a bipolar transistor having a gate in which a metal oxide semiconductor field effect transistor (MOSFET) is integrated. The boost IGBT 102A and the buck IGBT 102B are semiconductor elements (switching elements) which can perform high-power and high-speed switching. The boost IGBT 102A and the buck IGBT 102B are driven when a PWM voltage is applied to the gate terminals of the boost IGBT 102A and the buck IGBT 102B by the controller 30. Diodes 102a and 102b, which are rectifying elements, are connected to the boost IGBT 102A and the buck IGBT 102B in parallel, respectively.

The capacitor unit 19 may be an electrical power storage device, which can be charged and discharged so that the electrical power is exchanged between the capacitor unit 19 and the DC bus 110 through the buck-boost converter 100.

It is sufficient that the power source connection terminals 104 are terminals, to which the capacitor unit 19 is connectable, and the output terminals are terminals, to which the inverters 18 and 20 are connectable. The capacitor voltage detecting part 112 for detecting the capacitor voltage is connected between the pair of the power source connection terminals 104. The DC bus voltage detection part 111 for detecting the DC bus voltage is connected between the pair of output terminals 106.

The capacitor voltage detection part 112 detects a voltage value Vcap of the capacitor unit 19. The DC bus voltage detection part 111 detects a voltage value Vdc of the DC bus 110. The smoothing capacitor 107 is an electrical power storage element for smoothing the DC bus voltage and inserted between a positive terminal and a negative terminal of the output terminals 106. The voltage of the DC bus 110 is maintained to be a predetermined voltage by the smoothing capacitor 107.

The capacitor current detection part 113 detects a value of a current flowing between the capacitor unit 19 and the buck-boost converter 100 on a side of the positive electrode (a P terminal) of the capacitor unit 19 and includes a resistor for detecting the current. The capacitor current detection part 113 detects a current value I1 flowing through the positive electrode of the capacitor unit 19. The capacitor current detection part 116 detects a value of a current flowing between the capacitor unit 19 and the buck-boost converter 100 on a side of the negative electrode (a N terminal) of the capacitor unit 19 and includes a resistor for detecting the current. The capacitor current detection part 116 detects a current value I2 flowing through the negative electrode of the capacitor unit 19.

When the DC bus 110 is boosted by the buck-boost converter 100, a PWM voltage is applied to the gate terminal of the boost IGBT 102A. The induced electromotive force is generated in the reactor 101 when the boost IGBT 102A is turned on or off, and is supplied to the DC bus 110 through the diode connected in parallel to the buck IGBT 102B. Thus, the voltage of the DC bus 110 is boosted up.

When the DC bus 110 is bucked, a PWM voltage is applied to the gate terminal of the buck IGBT 102B. The regenerative electrical power supplied through the buck IGBT 102B and the inverters 18 and 20 is supplied to the capacitor unit 19 from the DC bus 110. Then, the electrical power stored in the DC bus 110 is charged into the capacitor unit 19 and the DC bus 110 is bucked.

Within this embodiment, a relay 130-1 is provided as a shutoff switch for shutting off a power source line 114, which connects the positive terminal of the capacitor unit 19 to the power source connection terminal 104 of the buck-boost converter 100. The relay 130-1 is arranged between the positive terminal of the capacitor unit 19 and a connection point 115 of the capacitor voltage detection part 112 connected to the power source line 114. The relay 130-1 is operated by a signal from the controller 30. By shutting the power source line 114 from the capacitor unit 19 off, the capacitor unit 19 can be disconnected from the buck-boost converter 100.

Further, a relay 130-2 is provided as a shutoff switch for shutting off a power source line 117, which connects the negative terminal of the capacitor unit 19 to the power source connection terminal 104 of the buck-boost converter 100. Further, a relay 130-2 is arranged between the negative terminal of the capacitor unit 19 and a connection point 118 of the capacitor voltage detection part 112 connected to the power source line 117. The relay 130-2 is operated by a signal from the controller 30. By shutting the power source line 117 from the capacitor unit 19 off, the capacitor unit 19 can be disconnected from the buck-boost converter 100. The relay 130-1 and the relay 130-2 may be integrated as a single relay to enable simultaneously disconnecting both of the power source line 114 on the positive terminal side and the power source line 117 on the negative terminal side from the capacitor unit 19.

Practically, there is a drive part for generating the PWM signal for driving the boost IGBT 102A and the buck IGBT 102B between the controller 30 and the boost IGBT and the buck IGBT 102A and 102B. However, the drive part is omitted from the illustration in FIG. 3. This drive part may be substantialized by any one of an electronic circuit or an arithmetic processing unit.

Figure 4:
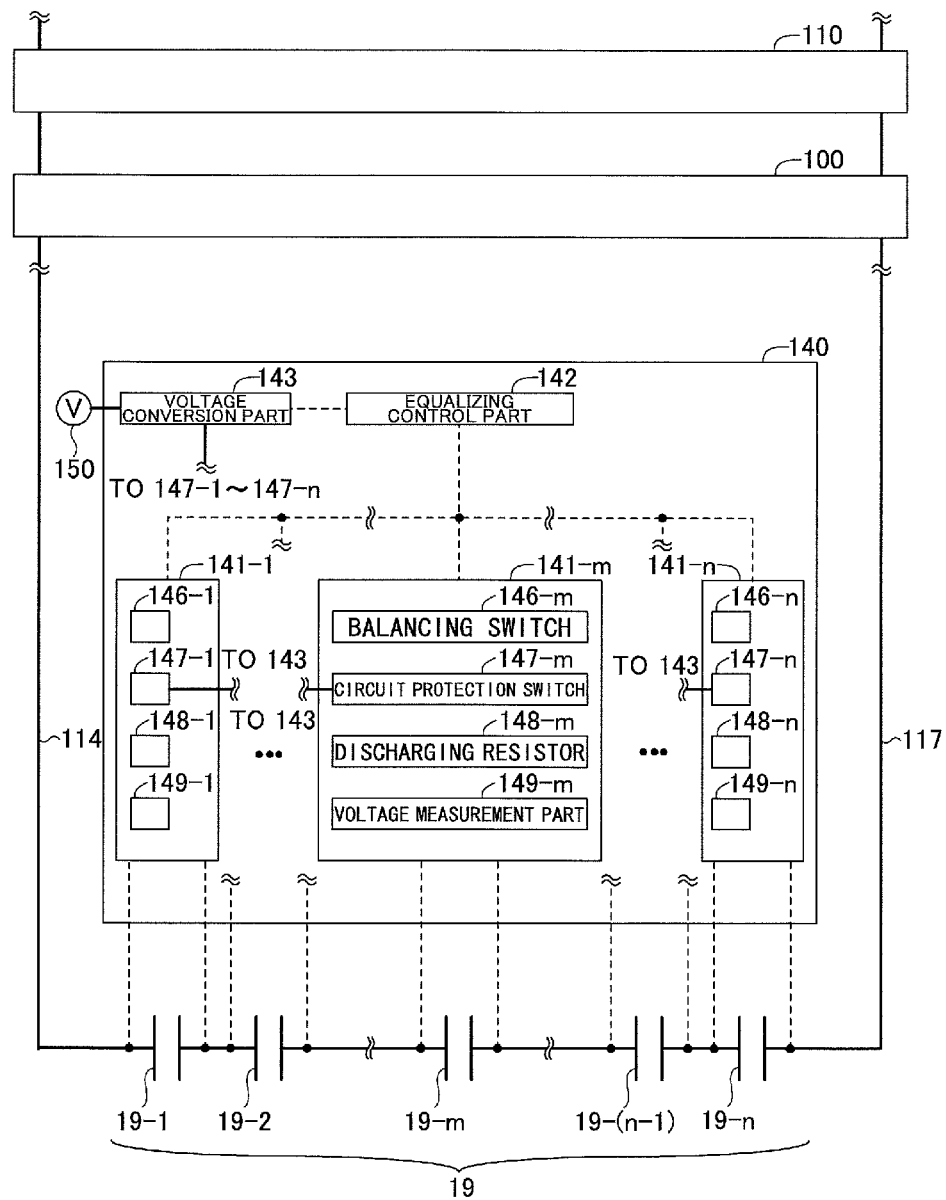
FIG. 4 is a schematic view illustrating a structure of a capacitor unit.

FIG. 4 is a schematic view illustrating a structure of the capacitor unit 19. Referring to FIG. 4, the capacitor unit 19 as the electrical power storage device practically includes n capacitor cells (hereinafter, referred to as an electrical power storage cell or simply a cell) 19-1 to 19-$n$ (n is an integer equal to 2 or greater) and an electrical power storage administration part 140. Referring to FIG. 4, an electrical drive system is indicated by a solid line, a control system is indicated by a broken line.

The electrical power storage administration part 140 is provided to administrate power storage of the capacitor unit 19 and mainly includes an equalizing circuit part 141, an equalizing control part 142, and a voltage conversion part 143.

The electrical power storage administration part 140 has an electrostatic capacitance measuring function of measuring the electrical capacities of the cells, an equalizing function of equalizing the electrical capacities of the cells, a circuit protecting function of preventing over discharge of the cells. Within this embodiment, for the convenience of explanation, all the n cells 19-1 to 19-$n$ are connected in series and one electrical power storage administration part 140 is provided for all the cells. However, it may be structured such that cells connected in series are defined as a single group, multiple groups are connected in series or parallel, and a single electrical power storage administration part is provided for each group. Further, another electrical power storage administration part may be provided to control the multiple electrical power storage administration parts as a superior authority.

Hereinafter, all the cells 19-1 to 19-$n$ may be collectively called a cell 19-$n$ or the n-th cell may be called a cell 19-$n$. The equalizing circuit part 141 and composing elements of the equalizing circuit parts 141 such as a balancing switch 146, a circuit protecting switch 147, a discharging resistor 148, a voltage measurement part 149, and so on are called in a manner similar thereto.

The equalizing circuit part 141 is an electrical circuit substantializing the electrostatic capacitance measuring function, the equalizing function, and the circuit protecting function. Within the embodiment, the equalizing circuit part 141 is directly controlled by the equalizing control part 142 to perform the electrostatic capacitance measuring function and the equalizing function, and is indirectly controlled through the voltage conversion part 143 to perform the circuit protecting function. The indirect control through the voltage conversion part 143 is effective to enhance independence of the circuit protecting function. For example, even if a problem occurs at a part of the equalizing control part 142 and the equalizing function is erroneously operated, it is effective to securely operate the circuit protecting function.

Specifically, each of the equalizing circuit parts 141-$n$ is connected to both ends of the corresponding one cell 19-$n$. For example, as illustrated in FIG. 4, two electrodes of a specific cell 19-$m$ (m is an integer of one or greater and n or smaller) are connected to the equalizing circuit part 141-$m$. Further, the equalizing circuit part 141-$m$ includes a balancing switch 146-$m$, a circuit protecting switch 147-$m$, and a discharging resistor 148-$m$. Further, in the equalizing circuit part 141-$m$, the balancing switch 146-$m$, the circuit protecting switch 147-$m$, and the discharging resistor 148-$m$ are connected in series between the two electrodes of the cell 19-$m$ and connected in parallel to the two electrodes of the cell 19-$m$. The balancing switch 146-$m$, the circuit protecting switch 147-$m$, and the discharging resistor 148-$m$ may be connected in any order as long as these are connected in series. Further, the equalizing circuit part 141-$m$ includes a voltage measurement part 149-$m$ for measuring the inter-electrode voltage of the cell 19-$m$.

The balancing switch 146-$n$ is provided to control the discharge of the cell 19-$n$ for equalizing the inter-electrode voltage of the cell so as to cause the cell 19-$n$ to discharge when the balancing switch 146-$n$ is in an ON (conduction) state and to cause the cell 19-$n$ to stop discharging when the balancing switch 146-$n$ is in an OFF (shutoff) state. Within this embodiment, the balancing switch 146-$n$ is made of a field effect transistor (FET) and is switched between the ON (conduction) state the OFF (shutoff) state in response to a balance control signal sent by the equalizing control part 142.

The circuit protecting switch 147-$n$ is a switch (a shutoff part) for preventing the overdischarge of the cell 19-$n$, and enables the discharge of the cell 19-$n$ in an ON (conduction) state and prohibits the discharge in an OFF (shutoff) state. Within the embodiment, the circuit protecting switch 147-$n$ is made of a field effect transistor (FET), and is switched between an ON (conduction) state and an OFF (shutoff) state in response to a voltage applied to the gate of the circuit protecting switch 147-$n$ by the voltage conversion part 143.

The equalizing control part 142 is provided to control the electrostatic capacitance measuring function, the equalizing function, and the circuit protecting function. Within the embodiment, the equalizing control part 142 controls the equalizing circuit part 141 and the voltage conversion part 143. Specifically, the equalizing control part 142 outputs a voltage detection command to an equalizing circuit part 141-$n$ and acquires a voltage detection value from the equalizing circuit part 141-$n$. Further, the equalizing control part 142 outputs the balance control signal to the balancing switch 146-$n$ so as to switch between the ON (conduction) state and the OFF (shutoff) state. Further, the equalizing control part 142 outputs an operation signal of a circuit protection signal to the voltage conversion part 143 so as to control a voltage applied to the gate of the circuit protecting switch 147-$n$ by the voltage conversion part 143. Within the embodiment, the equalizing control part 142 is operated by a voltage derived from the capacitor unit 19. However, the equalizing control part 142 may be operated by a voltage derived from an external battery such as a 24 V battery.

The voltage conversion part 143 is provided to control the circuit protecting function. Within the embodiment, the voltage conversion part 143 controls a voltage applied to the gate of the circuit protecting switch 147-$n$. Specifically, the voltage conversion part 143 converts the power source voltage of the power source 150 to a voltage (hereinafter, referred to as an "ON voltage") causing the circuit protecting switch 147-$n$ to be in the ON (conduction) state when an operation signal is received from the equalizing control part 142. When the ON voltage is applied to the gate of the circuit protecting switch 147-$n$, the circuit protecting switch 147-$n$ becomes in the ON (conduction) state. Meanwhile, the voltage conversion part 143 converts the power source voltage of the power source 150 to a voltage (hereinafter, referred to as an "OFF voltage") causing the circuit protecting switch 147-$n$ to be in the OFF (shutoff) state when a circuit protection signal is received from the equalizing control part 142. When the OFF voltage is applied to the gate of the circuit protecting switch 147-$n$, the circuit protecting switch 147-$n$ becomes in the OFF (shutoff) state. The power source voltage of the power source 150 may be a voltage derived from the capacitor unit 19 or an external battery such as a 24 V battery. Further, as long as the voltage conversion part 143 is in an operating state, the power source voltage of the power source 150 may be converted to the ON voltage and applied to the gate of the circuit protecting switch 147-$n$ regardless of whether the operation signal is received or not.

The electrical power storage administration part 140 having the above structure can individually measure the electrostatic capacitance of the cells 19-$n$ by the electrostatic capacitance measuring function.

In order to substantialize the electrostatic capacitance measuring function, the equalizing control part 142 includes an electrostatic capacitance calculation part (not illustrated) for calculating the electrical capacities based on the voltages of the cells 19-$n$ measured by the voltage measurement part 149-$n$.

When a voltage detection command is given to the voltage measurement part 149-$n$, the voltage detection command detects the inter-electrode voltages (hereinafter, the inter-electrode voltage is referred to as a cell voltage Vn) of the cells 19-$n$ and sends the detected cell voltages of the cells 19-$n$ to the electrostatic capacitance calculation part.

The electrostatic capacitance calculation part calculates the electrical capacities Cn of the cells 19-$n$ based on the value of the cell voltages Vn of the cells 19-$n$ sent from the voltage measurement part 149-$n$. The electrostatic capacitance Cn is calculated as follows.

At first, the cell voltage Vn0 of the cell 19-$n$ subjected to the calculation of the electrostatic capacitance at a time of starting to calculate the electrostatic capacitance Cn. Then, the balance control signal is sent to the gate of the balancing FET 146-$n$ as the balancing switch to close the balancing FET 146-$n$ to be in the ON (conduction) state. Thus, the cell is short-circuited and electricity is discharged from the cell 19-$n$. Because the discharging resistor 148-$n$ is provided in a short-circuiting line, a discharge current discharged from the cell 19-$n$ is a very small electrical current. Therefore, the cell voltage Vn of the cell 19-$n$ does not suddenly decrease but gradually decreases. After discharging for a predetermined time T, the cell voltage Vn1 at that time is detected. The electrostatic capacitance Cn of the cell 19-$n$ can be calculated using the following formula (1):

$$Cn = -T/(R1+R2) \times \ln^{-1}\{(R1+R2)/R2 \times Vn1/Vn0\} \quad (1)$$

Here, R1 designates an internal resistance of the cell 19-$n$, and R2 designates an internal resistance of the discharging resistor 148-$n$. However, R1 can be ignored because R1<<R2. Then, the following formula (2) can be introduced.

$$Cn = -T/R2 \times \ln^{-1}(Vn1/Vn0) \quad (2)$$

By comparing the calculated electrostatic capacitance Cn of the cell 19-$n$ with an initial electrostatic capacitance Cn (electrostatic capacitance before starting use of the cell 19-$n$) of the cell 19-$n$ previously acquired, it is possible to determine a degree of degradation of the cell at the present time.

When the degradation of the cell proceeds, the electrostatic capacitance becomes small and simultaneously the internal resistance increases. When the electrostatic capacitances and the internal resistances are not uniform between the cells, the cell voltages also become ununiform. Therefore, the voltages of the cells are partly high and partly low despite the application of the same current to the cells. As a result, the degraded cell is further degraded. Therefore, it is desirable to positively make the voltages of the cells uniform depending on the nonuniformity of degradation of the cells.

Within the embodiment, the equalizing function of the electrical power storage administration part 140 determines degradation degrees of the cells 19-$n$ based on the calculated electrostatic capacitance Cn at the present time. Then, the electrical power storage administration part 140 equalizes the cell voltages by causing only the cell, which requires the discharge depending on the degradation degree, to discharge electricity by the function of the equalizing circuit.

Figure 5:
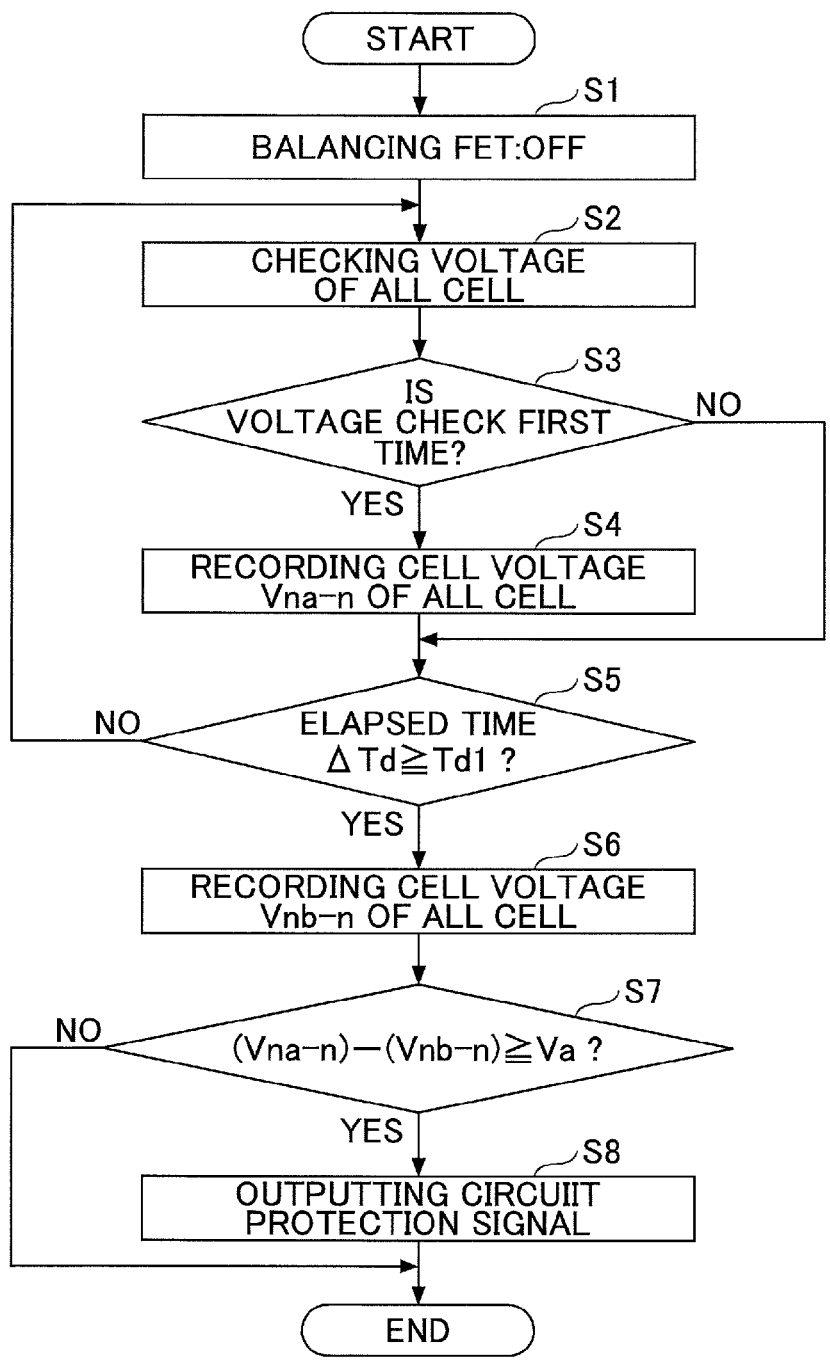
FIG. 5 is a flow chart illustrating a flow of a circuit protection process.
Figure 6:
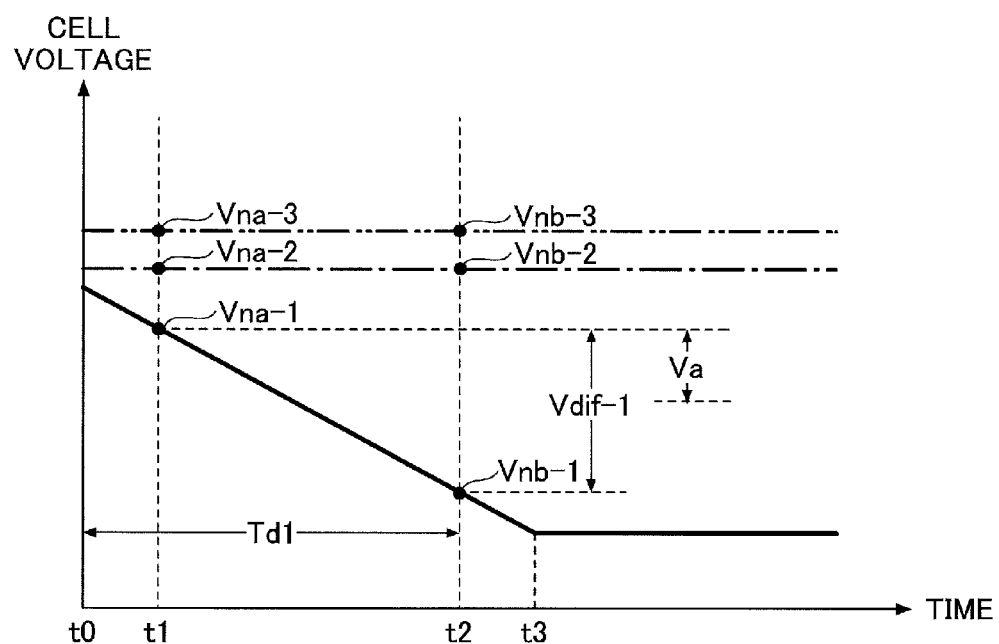
FIG. 6 illustrates a transition of a cell voltage.

Further, the electrical power storage administration part 140 prevents the overdischarge of the cells 19-$n$ by the circuit protecting function. Here, referring to FIGS. 5-6, described is the circuit protection process of preventing the overdischarge of the cells 19-$n$. FIG. 5 is a flowchart illustrating a flow of the circuit protection process. FIG. 6 illustrates a transition of the cell voltage when the circuit protection process is performed. In FIG. 6, a transition of the cell voltage related to the balancing FET 146-1, which is in a defect state, is indicated by a solid line, and transitions of the cell voltage related to the balancing FET 146-2 and the balancing FET 146-3, which are in a normal state, are indicated by a dot chain line and a two-dot chain line.

The circuit protection process is performed in a state where a current is not input into or output from the capacitor unit 19, said differently, a charge and discharge current does not flow through the cells 19-$n$ of the capacitor unit 19. The circuit protection process may be performed during the operation of the shovel in a state where there is no input of the current into the capacitor unit 19 and no output of the current from the capacitor unit 19. Specifically, the electrical power storage administration part 140 determines whether there is a defect in the equalizing circuit part 141-$n$ or not after the electrical power storage administration part 140 detects a charge and discharge stop state where there is no electrical current flowing between the capacitor unit 19 and the buck-boost converter 100 or actively making the charge and discharge stop state. In a case where the electrical power storage administration part 140 determines that there is a defect in the equalizing circuit part 141-$n$, the electrical power storage administration part 140 shuts off (breaks) connections between the equalizing circuit part 141-$n$ and the two electrodes of the corresponding cell 19-$n$ so as to prevent the overdischarge of the corresponding cell 19-$n$.

In step S1 of FIG. 5, the balance control signal is sent to the gates of the balancing FETs 146-$n$ of all the cells 19-$n$ to make the balancing FETs 146-$n$ in the OFF (shutoff) state (see a time t0 of FIG. 6).

Subsequently, in step S2, the cell voltages of all the cells 19-$n$ are checked (see a time t1 of FIG. 6). Subsequently, it is determined whether a check of the cell voltage is a first check in the circuit protection process at the present time in step S3. If the check of the cell voltage is a second check or later, the process goes to step S5. It is to prevent the cell voltage recorded at a time of starting the circuit protection process from being overwritten.

If it is determined in step S3 that the detection of the cell voltage is the first check in the circuit protection process at the present time, the process goes to step S4. In step S4, the cell voltages of all the cells 19-$n$ are recorded as a cell voltage Vna-n.

Next, in step S5, it is determined whether an elapsed time ΔTd after the balancing FET 146-$n$ is in the OFF (shutoff) state is a predetermined time Td1 or longer. If the elapsed time ΔTd is shorter than the predetermined time Td1, it is determined that a condition enabling the detection of a malfunction such as the short circuit in the balancing FET 146-$n$ or a fixture to the ON state in the balancing FET 146-$n$. Thus, the process returns to step S2 and a process on or after step S2 is performed again.

On the other hand, if the elapsed time ΔTd is the predetermined time Td1 is longer, the process goes to step S6. In step S6, the cell voltages of all the cells 19-$n$ are recorded as the cell voltage Vnb-n (see a time t2 of FIG. 6). Specifically, the cell voltages of all the cells 19-$n$ checked in the recent step S2 is recorded as the cell voltage Vnb-n.

Next, in step S7, the equalizing control part 142 as an equalizing circuit defect determination part determines whether there is a defect in the equalizing circuit part 141-$n$. Specifically, it is determined that a difference Vdif-n between a cell voltage Vna-n at a time of starting the circuit protection process and a cell voltage Vnb-n after a passage of a predetermined time Td1 from the time of starting the circuit protection process is a predetermined voltage Va or greater. If it is determined that the difference Vdif-n between the cell voltage Vna-n and the cell voltage Vnb-n is not the predetermined voltage Va or greater, namely it is determined that the malfunction such as the short circuit or the fixture to the ON state in the balancing FET 146-$n$ does not occur. Thus, it is determined that there is no defect in the equalizing circuit part 141-$n$, and the process returns to step S2 and a process on or after step S2 is performed again. This case corresponds to transitions of the cell voltages related to the balancing FET 146-2 and the balancing FET 146-3 in the normal state indicated by the dot chain line and the two-dot chain line of FIG. 6. A difference Vdif-2 between the cell voltage Vna-2 and cell voltage Vnb-2 related to the balancing FET 146-2 and difference Vdif-3 between the cell voltage Vna-3 and cell voltage Vnb-3 related to the balancing FET 146-3 are smaller than the predetermined voltage Va and substantially zero.

If it is determined that the difference Vdif-n between the cell voltage Vna-n and the cell voltage Vnb-n is the predetermined voltage Va or greater, it is determined that the malfunction such as the short circuit or the fixture to the ON state in the balancing FET 146-$n$ occurs. Thus, it is determined that there is a defect in the equalizing circuit part 141-$n$, and the process goes to step S8. This is because it is possible to determine that the cell 19-$n$ discharges electricity because the cell voltage drops even though the balancing FET 146-$n$ is in the OFF (shutoff) state. This case corresponds to a transition of the cell voltage related to the balancing FET 146-1 in a defect state indicated by the solid line in FIG. 6. The difference Vdif-1 between the cell voltage Vna-1 and the cell voltage Vnb-1 related to the balancing FET 146-1 is greater than the predetermined voltage Va.

In step S8, the circuit protection signal is output to the voltage conversion part 143. The voltage conversion part 143 receiving the circuit protection signal applies an OFF voltage to the gate of the circuit protecting switch 147-$n$ corresponding to the balancing FET 146-$n$ causing the malfunction such as the short circuit or the fixture to the ON state in the balancing switch 146-$n$. As a result, the circuit protecting switch 147-$n$ corresponding to the balancing FET 146-$n$ causing the malfunction such as the short circuit or the fixture to the ON state in the balancing switch 146-$n$ becomes in the OFF (shutoff) state so as to prohibit discharge of the cell 19-$n$ corresponding to the balancing FET 146-$n$ causing the malfunction such as the short circuit or the fixture to the ON state in the balancing switch 146-$n$ (see a time t3 of FIG. 6). This case corresponds to the transition of the cell voltage related to the balancing FET 146-1 in the defect state indicated by the solid line in FIG. 6. A decrease of the cell voltage related to the balancing FET 146-1 is stopped as a result of the prohibition of the discharge of the cell 19-1 at the time t3.

With the above structure, the electrical power storage administration part 140 causes the circuit protecting switch 147-$n$ corresponding to the balancing FET 146-$n$ causing the malfunction such as the short circuit or the fixture to the ON state in the balancing switch 146-$n$ to be in the OFF (shutoff) state so as to prevent the over discharge of the cell 19-$n$.

Figure 7:
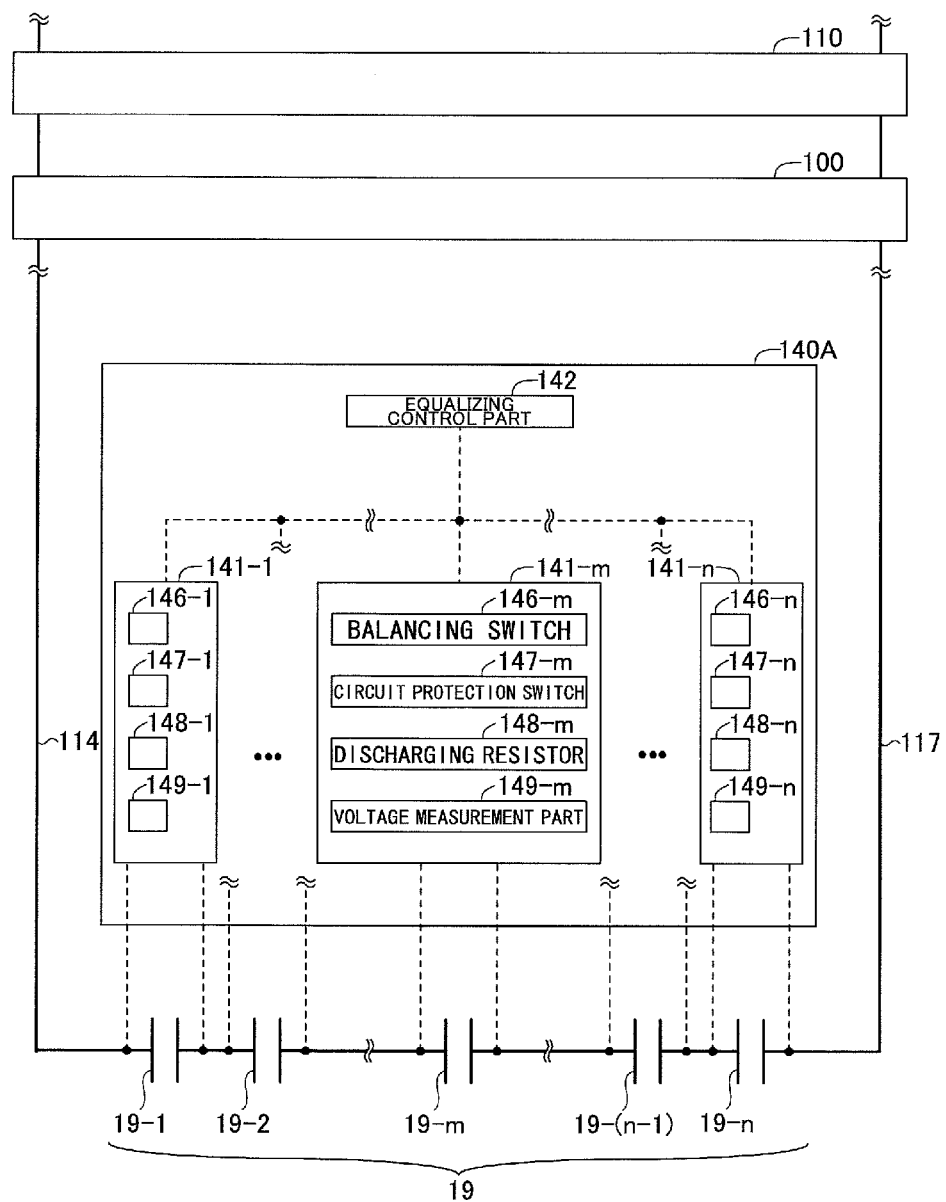
FIG. 7 is a schematic view illustrating a structure of the capacitor unit.

Next, referring to FIG. 7, another exemplary structure 140A of the electrical power storage administration part is described. FIG. 7 is a schematic view of the structure of the capacitor unit 19 and corresponds to FIG. 4. Therefore, the same reference symbols are attached to commonly used composing elements, and description thereof is omitted.

The electrical power storage administration part 140A differs from the electrical power storage administration part 140 at a point that the voltage conversion part is omitted. Specifically, the equalizing control part 142 of the electrical power storage administration part 140A does not indirectly switch between the ON (conduction) state and the OFF (shutoff) state of the circuit protecting switch 147-$n$ through the voltage conversion part but directly switches between the states of the circuit protecting switch 147-$n$.

More specifically, when the equalizing control part 142 determines that there occurs the malfunction such as the short circuit or the fixture to the ON state in the balancing switch 146-$n$ as determined in the above circuit protection process, the circuit protection signal is output to the circuit protecting switch 147-$n$ corresponding to the balancing switch 146-$n$ causing the malfunction.

Within the embodiment, the equalizing control part 142 sends the circuit protection signal to the gate of the circuit protection FET 147-$n$ as the circuit protecting switch to make the circuit protection FET 147-$n$ in the OFF (shutoff) state. Within the embodiment, when the equalizing circuit part 141-$n$ is in the operating state, the ON voltage is applied to the circuit protection FET 147-$n$ to cause the circuit protection FET 147-$n$ to be in the ON (conduction) state. The circuit protection FET 147-$n$ may be operated by the same power source as that for the balancing FET 146-$n$ as the balancing switch or may be operated by a power source different from the power source for the balancing FET 146-$n$. The circuit protection FET 147-$n$ may be operated by a voltage derived from the capacitor unit 19 or a voltage derived from an external battery such as a 24 V battery.

It should be understood that the invention is not limited to the above-described embodiment, but may be modified into various forms on the basis of the spirit of the invention. Additionally, the modifications are included in the scope of the invention.

EXPLANATION OF REFERENCE SYMBOLS

1: lower-part traveling body
1A, 1B: hydraulic motor
2: swivel mechanism
3: upper-part swiveling body
4: boom
5: arm
6: bucket
7: boom cylinder
8: arm cylinder
9: bucket cylinder
10: cabin
11: engine
12: motor generator
13: transmission
14: main pump
15: pilot pump
16: high-pressure hydraulic line
17: control valve
18, 20: inverter
19: capacitor unit
19-$n$: cell
21: swivel motor
22: resolver
23: mechanical brake
24: swivel transmission
25: pilot line
26: operation device
26A, 26B: lever 26C: pedal
26D: button switch
27: hydraulic line
28: hydraulic line
29: pressure sensor
30: controller
32: drive control apparatus
40: electrical swivel control device
60: main control part
101: reactor
102A: boost IGBT
102B: buck IGBT
104: power source connection terminal
106: output terminal
107: capacitor
110: DC bus
111: DC bus voltage detection part
120: electrical power storage apparatus
140, 140A: electrical power storage administration part
141: equalizing circuit part
142: equalizing control part
143: voltage conversion part
146-1 to 146-*n*: balancing FET
147-1 to 147-*n*: circuit protecting switch
148-1 to 148-*n*: discharging resistor
149-1 to 149-*n*: voltage measurement part
150: power source

What is claimed is:

1. A shovel comprising:
a lower-part traveling body; and
an upper-part swiveling body that
is mounted on the lower-part traveling body through a swivel mechanism and
includes a boom, an arm, a bucket, a boom cylinder for hydraulically driving the boom, an arm cylinder for hydraulically driving the arm, a bucket cylinder for hydraulically driving the bucket, a main pump, a control valve, an engine, a motor generator, a swivel motor, a first inverter for the motor generator, a second inverter for the swivel motor, and a controller,
wherein the boom cylinder, the arm cylinder, and the bucket cylinder are connected to the main pump through the control valve,
wherein the control valve functions as a hydraulic control device that controls a hydraulic system,
wherein the main pump is driven by the engine,
wherein the motor generator assists the engine and generates electricity,
wherein the controller performs a drive control of the shovel based on an input using an operation lever,
the shovel further comprising:
an electrical power storage device that is made of
a plurality of electrical power storage cells for charging electricity generated by the motor generator; and
an electrical power storage administration part that includes
equalizing circuits each of which is connected to corresponding one of the plurality of electrical power storage cells to perform an equalizing function, and
an equalizing control part for controlling the equalizing circuits,
wherein each of the equalizing circuits includes
a balancing switch,
a circuit protecting switch, and
a resistor, the balancing switch, the circuit protecting switch, and the resistor being connected in series and further being connected to the corresponding electrical power storage cell, circuit protecting switches of the equalizing circuits being respectively connected to the plurality of electrical power storage cells in a one-on-one correspondence,
wherein each of the equalizing circuits switches between conduction or shutoff of the corresponding balancing switch in response to a balance control signal output by the equalizing control part to perform the equalizing function,
wherein each electrical power storage cell is discharged from a corresponding resistor when the corresponding balancing switch and the corresponding circuit protecting switch are in a conduction state,
wherein an electrical power storage administration part causes the equalizing control part to determine whether a defect exists in the equalizing circuit after detecting a charge and discharge stop state, or making and the charge and discharge stop state, and
wherein the equalizing control part outputs a circuit protection signal for shutting off the circuit protecting switch when the equalizing control part determines that there is a defect in the equalizing circuit in a case where the equalizing control part outputs the balance control signal for shutting off the balancing switch.

2. The shovel according to claim 1,
wherein the electrical power storage administration part continuously equalizes the electrical power storage cell by the equalizing circuit until the defect is determined to exist in the equalizing circuit.

3. The shovel according to claim 1,
wherein the equalizing control part determines that there is the defect in the balancing switch of the equalizing circuit when an inter-electrode voltage of the corresponding electrical power storage cell decreases by a predetermined voltage or greater during a predetermined time in the case where the equalizing control part outputs the balance control signal for shutting off the balancing switch.

4. The shovel according to claim 1,
wherein the electrical power storage administration part detects the charge and discharge stop state, in which there is no electrical current flowing through the electrical power storage device and the buck-boost converter, or actively makes the charge and discharge stop state, and thereafter determines whether there exists the defect in the equalizing circuit.

5. A method of controlling a shovel including an electrical power storage device that is made of
a plurality of electrical power storage cells for charging electricity generated by a motor generator, and
an electrical power storage administration part that includes
equalizing circuits each of which is connected to corresponding one of the plurality of electrical power storage cells to perform an equalizing function, and
an equalizing control part for controlling the equalizing circuits,
wherein each of the equalizing circuits includes
a balancing switch,
a circuit protecting switch, and
a resistor, the balancing switch, the circuit protecting switch, and the resistor being connected in series and further being connected to the corresponding electrical power storage cell, circuit protecting switches of the equalizing circuits being respectively connected to the plurality of electrical power storage cells in a one-on-one correspondence, the method comprising steps of:

switching, by each of the equalizing circuits, between conduction or shutoff of the corresponding balancing switch in response to a balance control signal output by the equalizing control part to perform the equalizing function, discharging each electrical power storage cell from a corresponding resistor when the corresponding balancing switch and the corresponding circuit protecting switch are in a conduction state, causing the equalizing control part to determine whether a defect exists in the equalizing circuit after detecting a charge and discharge stop state, or making and the charge and discharge stop state, outputting the balance control signal for switching between shutoff or conduction of the balancing switch, and outputting a circuit protection signal for shutting off the circuit protecting switch when the equalizing control part determines that there is a defect in the equalizing circuit in a case where the equalizing control part outputs the balance control signal for shutting off the balancing switch.

6. The method according claim 5, further comprising outputting the circuit protection signal for shutting off the corresponding circuit protection signal when an inter-electrode voltage of the corresponding electrical power storage cell decreases by a predetermined voltage or greater during a predetermined time in a case where the balance control signal for shutting off the balancing switch is output.

* * * * *